United States Patent
Bennett et al.

(10) Patent No.: US 10,515,064 B2
(45) Date of Patent: Dec. 24, 2019

(54) KEY-VALUE STORAGE SYSTEM INCLUDING A RESOURCE-EFFICIENT INDEX

(71) Applicant: Microsoft Technology Licensing, LLC, Redmond, WA (US)

(72) Inventors: John G. Bennett, Sammamish, WA (US); Chen Fu, Cupertino, CA (US); Ashwini S. Khade, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 625 days.

(21) Appl. No.: 15/207,355

(22) Filed: Jul. 11, 2016

(65) Prior Publication Data

US 2018/0011852 A1    Jan. 11, 2018

(51) Int. Cl.
*G06F 16/22* (2019.01)
*G06F 16/9535* (2019.01)

(52) U.S. Cl.
CPC ...... *G06F 16/2255* (2019.01); *G06F 16/2228* (2019.01); *G06F 16/2272* (2019.01); *G06F 16/9535* (2019.01)

(58) Field of Classification Search
CPC ........... G06F 17/3033; G06F 17/30949; G06F 17/30321; G06F 17/30336; G06F 16/2228; G06F 16/2255; G06F 16/2272; G06F 16/9535
USPC .......................... 707/747, 744, 756, 212, 224
See application file for complete search history.

(56) References Cited

U.S. PATENT DOCUMENTS

| | | | |
|---|---|---|---|
| 5,692,177 | A | 11/1997 | Miller |
| 5,956,705 | A | 9/1999 | Stevens et al. |
| 6,014,733 | A | 1/2000 | Bennett |
| 7,409,526 | B1 | 8/2008 | Ng et al. |
| 8,037,076 | B2 | 10/2011 | Schneider |
| 8,266,152 | B2 | 9/2012 | Millett |
| 8,429,133 | B2 | 4/2013 | Lahiri |
| 8,812,555 | B2 | 8/2014 | Larson et al. |
| 8,938,480 | B2 | 1/2015 | Xu |
| 9,104,551 | B2 | 8/2015 | Sprouse et al. |

(Continued)

OTHER PUBLICATIONS

Debnath et al. ("Journal Proceedings of the VLDB Endowment VLDB Endowment Homepage archive"; vol. 3, Issue 2, Sep. 2010; pp. 1414-1425) (Year: 2010).*

(Continued)

*Primary Examiner* — Jay A Morrison
*Assistant Examiner* — Ken Hoang
(74) *Attorney, Agent, or Firm* — Rainier Patents, P.S.

(57) ABSTRACT

A key-value storage system is described herein for interacting with key-value entries in a content store using a resource-efficient index. The index provides a data structure that includes a plurality of hash buckets. Each hash bucket includes a linked list of hash bucket units. The key-value storage system stores hash entries in each linked list of hash bucket units in a distributed manner between an in-memory index store and a secondary index store, based on time of their creation. The key-value storage system is further configured to store hash entries in a particular collection of linked hash bucket units in a chronological order to reflect time of their creation. The index further includes various tunable parameters that affect the performance of the key-value storage system.

20 Claims, 11 Drawing Sheets

(56) References Cited

U.S. PATENT DOCUMENTS

| | | | |
|---|---|---|---|
| 9,275,110 | B2 | 3/2016 | Pradhan et al. |
| 9,280,609 | B2* | 3/2016 | Liu .................. G06F 17/30949 |
| 2009/0271366 | A1* | 10/2009 | Ellison .............. G06F 17/30949 |
| 2010/0257181 | A1 | 10/2010 | Zhou et al. |
| 2012/0102298 | A1 | 4/2012 | Sengupta et al. |
| 2013/0036289 | A1* | 2/2013 | Welnicki .............. G06F 3/0608 |
| | | | 711/173 |
| 2014/0019868 | A1 | 1/2014 | Varian |
| 2016/0378832 | A1* | 12/2016 | Zhuge .................. G06F 17/303 |
| | | | 707/752 |

OTHER PUBLICATIONS

Lim, et al., "A Memory-Efficient, High-Performance Key-Value Store," in Proceedings of the 23rd ACM Symposium on Operating Systems Principles, 2011, 13 pages.

Grama, et al., "Parallel Matrix-Vector Product Using Approximate Hierarchical Methods," in Proceedings of IEEE/ACM SC95 Conference on Supercomputing, 1995, 17 pages.

Bohannon, et al., "Main-Memory Index Structures with Fixed-Size Partial Keys," in Proceedings of the ACM SIGMOD International Conference on Management of Data, 2001, 13 pages.

Michael, Maged M., "High Performance Dynamic Lock-Free Hash Tables and List-Based Sets," in Proceedings of the Fourteenth Annual ACM Symposium on Parallel Algorithms, 2002, 10 pages.

Key-value database, available at <<https://en.wikipedia.org/wiki/Key-value_database>>, Wikipedia online article, retrieved on May 25, 2016, 4 pages.

Sedgewick, et al., Algorithms, 4th Edition, available at <<http://freecomputerbooks.com/Algorithms-4th-Edition-by-Robert-Sedgewick-and-Kevin-Wayne.html>>, product page only, Addison-Wesley Professional, 4th Ed., Mar. 19, 2011, retrieved on May 25, 2016, 2 pages.

"RocksDB, A persistent key-value store for fast storage environments," available at <<http://rocksdb.org/>>, Facebook, Inc., Menlo Park, CA, retrieved on May 25, 2016, 3 pages.

Lin, et al., "PacificA: Replication in Log-Based Distributed Storage Systems," available at <<http://research.microsoft.com/apps/pubs/default.aspx?id=66814>>, in Microsoft Technical Report No. MSR-TR-2008-25, 2008, 14 pages.

"Bloom filter," available at <<https://en.wikipedia.org/wiki/Bloom_filter>>, Wikipedia online article, retrieved on May 26, 2016, 15 pages.

"B-tree," available at <<https://en.wikipedia.org/wiki/B-tree>>, Wikipedia online article, retrieved on May 26, 2016, 13 pages.

PCT Search Report and Written Opinion for PCT Application No. PCT/US2017/040627, dated Jul. 4, 2017, 12 pages.

* cited by examiner

QUERYING A KEY (CONTINUED)
902

( CONTINUED FROM FIG. 9 )

↓

IDENTIFY MATCHING HASH BUCKET BASED ON THE HASH BUCKET IDENTIFIER
1002

↓

IDENTIFY MATCHING HASH BUCKET UNIT BY COMPARING THE SET MEMBERSHIP FILTER ENTRY TO EACH SET MEMBERSHIP FILTER UNTIL A MATCH IS FOUND, IF ANY. THE MATCHING HASH BUCKET UNIT INCLUDES AN ASSOCIATED MATCHING HASH BLOCK
1004

↓

IS THE MATCHING HASH BLOCK IN THE IN-MEMORY INDEX STORE?
1006

Y →

N ↓

RETRIEVE THE MATCHING HASH BLOCK FROM THE SECONDARY INDEX STORE AND STORE IT IN THE IN-MEMORY INDEX STORE
1008

↓

IDENTIFY A MATCHING HASH ENTRY BY COMPARING THE PARTIAL KEY TO EACH HASH ENTRY IN THE MATCHING HASH BLOCK UNTIL A MATCH IS FOUND. IF NO MATCH IS FOUND IN THE MATCHING HASH BLOCK, CONTINUE THE SEARCH IN SUBSEQUENT HASH BLOCKS, E.G., BY RETURNING TO OPERATION 1004. IF THE LAST HASH BLOCK IS SEARCHED AND THE MATCHING HASH ENTRY HAS NOT BEEN FOUND, THEN END.
1010

QUERYING A KEY (CONTINUED)
902

Continued From Fig. 10

Retrieve a Key-Value Entry from the Content Store that Matches an Address Value Specified by the Matching Hash Entry, to Provide a Retrieved Key-Value Entry
1102

Does the Full Key Specified in the Retrieved Key-Value Entry Match the Full Key of the Sought-After Key-Value Entry?
1104

Y → End

N → Mark the Matching Hash Entry as Invalid and Continue the Search of the Index, e.g., by Returning to Block 1010
1106

End

FIG. 11

KEY-VALUE STORAGE SYSTEM INCLUDING A RESOURCE-EFFICIENT INDEX

BACKGROUND

A key-value storage system uses an index to access information in a content store. For instance, the key-value storage system uses the index to map a given key to a location of a corresponding value in the content store. Commonly, an index performs this mapping operation using an in-memory hash table. It is nevertheless a challenging task to provide an in-memory index that provides satisfactory performance in a resource-efficient manner.

SUMMARY

A key-value storage system is described herein for using a resource-efficient index to interact with key-value entries in a content store. Overall, the index enables the key-value storage system to offer good performance from the standpoint of memory usage, speed of operation, and processor load.

According to one illustrative aspect, the index provides a data structure that includes a plurality of hash buckets. Each hash bucket includes a linked list of hash bucket units. Each hash bucket unit, in turn, includes a set membership filter (e.g., a bloom filter) and a hash block. The hash block stores a collection of hash entries. The set membership filter provides a mechanism for testing whether a corresponding hash block may contain a particular hash entry being sought.

According to another illustrative aspect, each hash entry in a hash block includes a partial key. The partial key has reduced size compared to a full counterpart key provided in the content store.

According to another illustrative aspect, the key-value storage system stores the hash blocks associated with a hash bucket in a distributed manner between an in-memory index store and a secondary index store, such as, but not limited to, a disk-based secondary index store.

According to another illustrative aspect, the key-value storage system is configured to store hash entries in a particular collection of linked hash bucket units in a generally chronological order, e.g., by storing each new hash entry in a head hash bucket unit of the particular collection, and creating a new head hash bucket unit when a previous head hash bucket unit cannot accommodate the new hash entry.

According to another illustrative aspect, the key-value storage system does not include a sorting function for use in sorting key values. For this reason, the key-value storage system can eliminate the processing burden associated with a sorting function.

According to another illustrative aspect, the index further includes various tunable parameters (described herein) that affect the performance of the key-value storage system. A developer may tune the values of the parameters to balance memory consumption, system speed and processor load, to achieve a desired overall level of performance.

According to another illustrative aspect, the key-value storage system includes a mechanism for updating the index in response to a garbage collection process. The mechanism provides a service which is agnostic with respect to the particular nature of the garbage collection process.

According to another illustrative aspect, the key-value storage system provides a way of preserving (and later accessing) plural versions of each key-value entry in the content store.

The above-summarized functionality can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 also shows a relationship of the data structure to key-value entries stored in a content store.

FIGS. 9-11 together show a process for querying a key of a sought-after key-value entry using the key-value storage system of FIG. 1.

Figure 1:
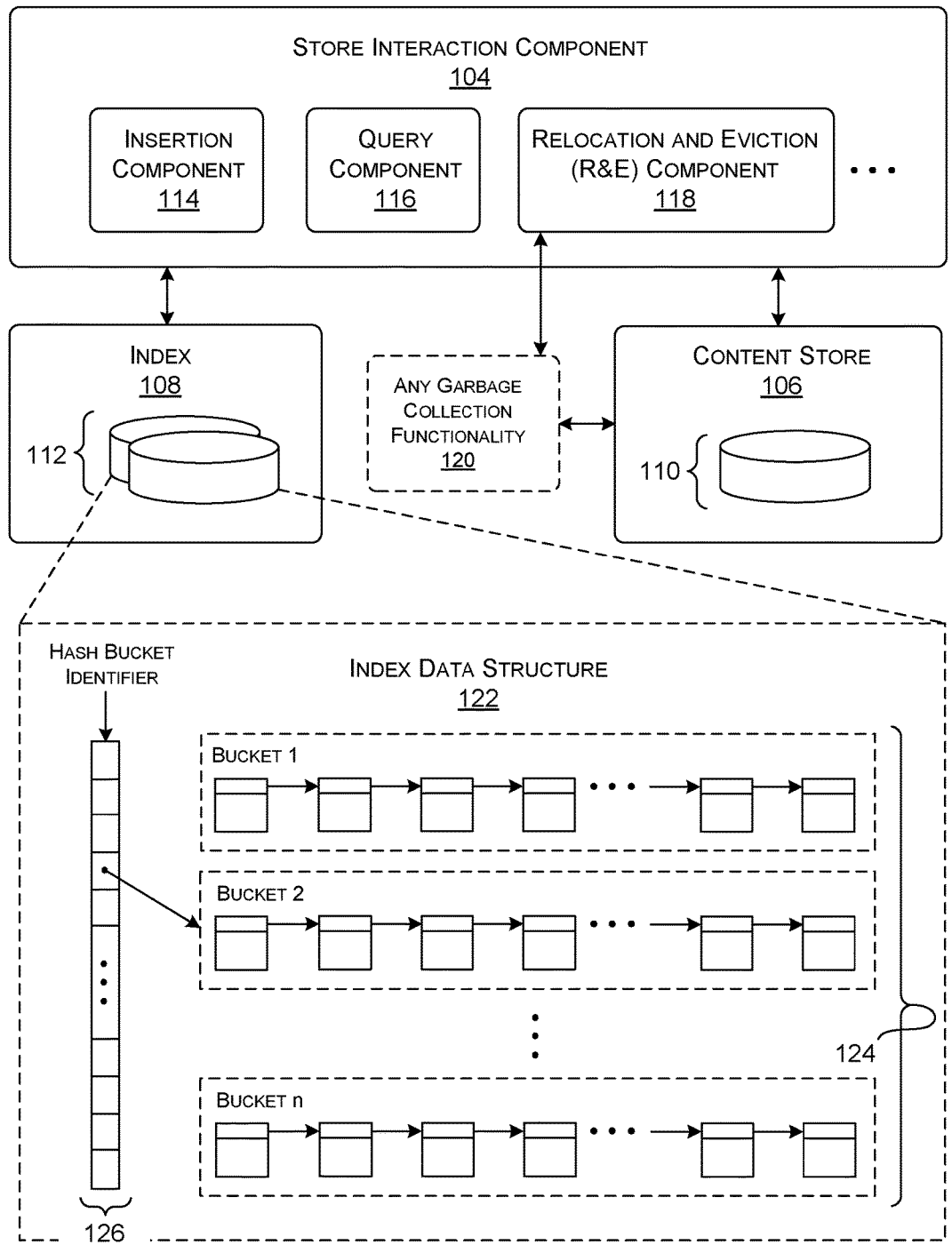
FIG. 1 shows an overview of a key-value storage system that uses a resource-efficient index.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for interacting with key-value entries using a resource-efficient index. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

As noted above, a key-value storage system uses an in-memory index to map a given key to a location of a corresponding value in a content store. Such a technique, however, can consume a significant amount of memory, particularly in the case in which there are a large number of keys to contend with and/or when the sizes of the keys are large. Some key-value storage systems address the above-noted challenge using the B-tree technique. But the B-tree technique requires processing operations (such as sorting) that place a significant processing burden on the key-value storage system.

FIG. 1 shows a key-value storage system 102 that addresses at least the above-noted technical challenge. The key-value storage system 102 includes a store interaction component 104, a content store 106, and an index 108. The store interaction component 104 interacts with the content store 106 using the index 108.

The content store 106 stores a plurality of key-value entries. Each key-value entry, in turn, specifies at least a full key and an associated value. The value provides content associated with the key-value entry. The key corresponds to an identifier associated with the value. For example, consider the merely illustrative case in which the content store 106 stores information regarding a collection of websites. In that context, each key may correspond to the URL associated with a particular website. The value may correspond to the website contents associated with the particular website. Consider another case in which the content store 106 provides credit history information regarding a plurality of customers. In that context, each key may correspond to an ID associated with a corresponding customer. The value may correspond to that customer's credit history.

The content store 106 can be implemented using one or more physical data stores 110. For example, the content store 106 can be implemented using a hard disk storage mechanism, a solid-state storage mechanism, etc., or any combination thereof.

The index 108 stores, among other information, a plurality of hash entries. Each hash entry, in turn, can specify at least a partial key, an address value, size information, etc. A partial key corresponds to a reduced-size version of a corresponding full key. For example, the partial key may represent a 27 bit version of a counterpart full 128 bit key. The following description (with reference to FIG. 4) will provide further details on different ways of computing the partial key. Without limitation, in one approach, the key-value storage system 102 computes the partial key by taking a portion of a full key (e.g., by taking one half of a 128 bit full key), hashing that portion to generate a hash result, and then truncating that hash result to a desired size (e.g., to 27 bit). The address value specifies a location at which a corresponding key-value entry is stored in the content store 106. The size information specifies the size of the key-value entry stored in the content store 106.

The index 108 can be implemented using two or more physical data stores 112. For example, the key-value store 106 can be implemented using an in-memory index store (also referred to as a "memory index store") together with a secondary index store. The secondary index store may correspond to a hard disk storage mechanism, a solid-state storage mechanism, etc., or any combination thereof. Information in the in-memory index store is more readily accessible to the store interaction component 104 compared to the secondary index store.

In one implementation, the secondary index store (associated with the index 108) is implemented by at least part of the same physical data store associated with the content store 106. In another implementation, the secondary index store and the content store 106 are implemented by two separate physical data stores.

The store interaction component 104 includes (or can be conceptualized as including) plural subcomponents that perform different respective functions. An insertion component 114 inserts new key-value entries in the content store 106, and adds counterpart new hash entries in the index 108. A query component 116 retrieves a key-value entry from the content store 106 using the index 108. That is, given a specified full key, the query component 116 uses the index 108 to retrieve a key-value entry from the content store 106 that is associated with the given full key. A relocation and eviction (R&E) component 118 updates the index 108 in response to a garbage collection process performed by garbage collection functionality 120. For instance, the R&E component 118 accounts for the movement of key-value entries from old locations to new locations within the content store 106. The R&E component 118 also accounts for the eviction of key-value entries from the content store 106. Section B sets forth processes which describe the illustrative operation of the insertion component 114, the query component 116 and the R&E component 118.

FIG. 1 also shows one data structure 122 for use in organizing information within the index 108. The data structure 122 includes a plurality of hash buckets 124. In one non-limiting and illustrative case, the data structure 122 includes 1024 hash buckets for storing 10 GB of data. The data structure 122 also includes a bucket index 126 for mapping a hashed version of a specified full key to one of the hash buckets 124. The hashed version of the specified full key is referred to herein as a hash bucket identifier.

Each hash bucket includes a plurality of linked hash bucket units, such as, without limitation, a maximum number of 20 hash bucket units. In one implementation, the plurality of linked hash bucket units can be formed as a linked list of hash bucket units. A head hash bucket unit corresponds to a first hash bucket unit in a linked list. The head hash bucket unit is linked to a second hash bucket unit in the linked list. The second hash bucket unit is linked to the third hash bucket unit in the linked list, and so on. The bucket index 126 includes pointers which map to the respective head hash bucket units.

Figure 2:
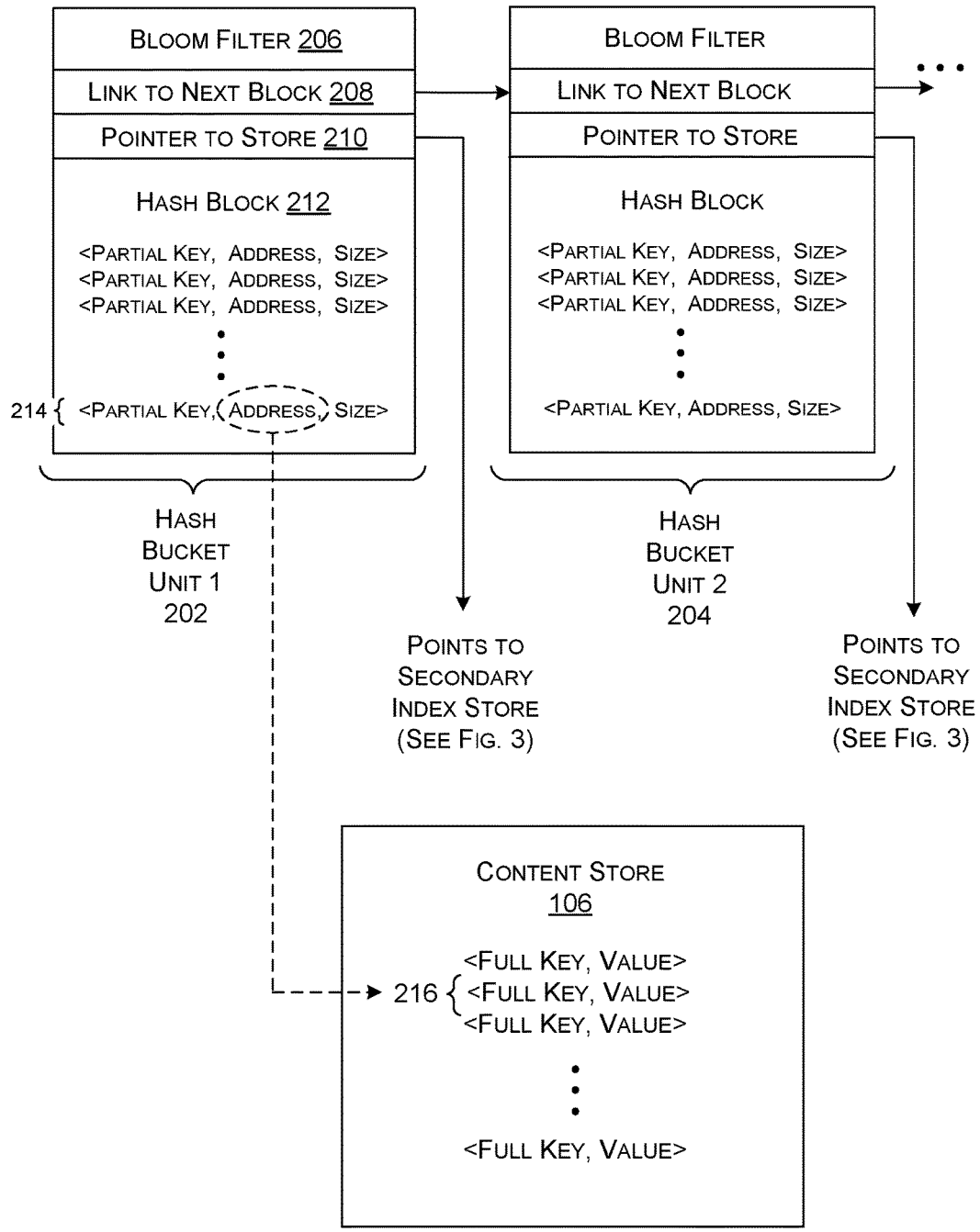
FIG. 2 shows a portion of a data structure used by the index.

FIG. 2 shows the illustrative composition of two hash bucket units (202, 204) in a linked list of hash bucket units. The composition of the illustrative hash bucket unit 202 is explained below. Other hash bucket units, such as the hash bucket unit 204, have the same composition as the hash bucket unit 202.

The hash bucket unit 202 includes a bloom filter 206. At any given time, the bloom filter 206 represents a set of one or more bloom filter keys, e.g., by storing a set of bloom filter entries derived from the bloom filter keys. Each bloom filter key (and a corresponding bloom filter entry), in turn, is derived from a corresponding full key in a manner that will be described below (with reference to FIG. 4). In operation, the query component 116 can query the bloom filter 206 to determine whether a specified bloom filter key is included within its set of bloom filter keys. If this query is answered in the affirmative, the query component 116 can conclude that the hash bucket unit 202 may include a hash entry being sought, subject to the possibility of a false positive. If this query is answered in the negative, the query component 116 can conclusively determine that the hash bucket unit 202 does not contain the hash entry being sought.

In other words, the bloom filter 206 may produce a false positive, but cannot produce a false negative. A false positive occurs when the bloom filter 206 indicates that a specified bloom filter key is a member of its set, but, in fact, the bloom filter key is not a member of the set. A false negative (which cannot occur) corresponds to the case in which the bloom filter 206 indicates that a specified bloom filter key is not a member of its set, when it is, in fact, actually a member. The individual bloom filter 206 produces false positives at a specified rate, which is typically very low.

The hash bucket unit 202 further includes a link 208 to a next successive hash bucket unit, in this case, corresponding to hash bucket unit 204. The hash bucket unit 202 further includes a pointer 210 to a location of a hash block 212 in the secondary index store. In operation, the query component 116 can first query the bloom filter 206 to determine whether a given bloom filter key is included within the bloom filter's set of encoded bloom filter keys. This matching outcome also conveys whether a hash entry being sought is included within the hash block 212. Upon a matching result, the query component 116 then determines whether the hash bucket unit 202 currently stores the hash block 212 in its in-memory (primary) index store. If not, the query component 116 can use the pointer 210 to retrieve the hash block 212 from the secondary index store and store it in the in-memory index store.

The above-described distributed manner of storing hash blocks is one factor which helps reduce the memory requirements of the key-value storage system 102. For instance, the index 108 can selectively retrieve a hash block from the secondary index store only when it is determined (by a corresponding bloom filter) that the hash block may contain a hash entry being sought. For each bloom filter that provides a negative matching result within a hash bucket, there is no need to store its corresponding hash block in the in-memory (primary) index store.

The hash block 212 itself includes a plurality of hash entries, such as, in one non-limiting implementation, 512 hash entries. The key-value storage system 102 employs a plurality of hash entries to facilitate storage and retrieval of the hash entries from the secondary index store, as opposed to storing and retrieving hash entries on an individual basis. Each hash entry includes at least a partial key, an address value, and size information. As noted above, the partial key can correspond to a hashed portion of the full key. The use of partial keys (instead of counterpart full keys) in the index 108 further reduces the amount of memory used by the index 108. The address value specifies a location where a corresponding key-value entry is stored in the content store 106. For instance, consider a particular hash entry 214. That hash entry 214 includes an address value which points to the location of a key-value entry 216 in the content store 106. The size information describes the size of a corresponding key-value entry in the content store 106.

Although not explicitly shown in FIG. 2, each hash bucket unit can also store a bloom key block that provides the original bloom filter keys that were used to generate the bloom filter entries in the unit's bloom filter. The key-value storage system 102 relies on the bloom filter keys stored in the bloom key blocks during the below-described garbage collection process. More specifically, the key-value storage system 102 relies on the bloom filter keys to reconstruct the bloom filters in the index 108 in response to the movement and deletion of entries in the content store 106, and corresponding changes made to the index 108. The hash blocks cannot be relied on to reconstruct the bloom filters because they do not store the portions of the full keys that were used to construct the bloom filters. In other implementations, the bloom filter keys can be stored in other locations and/or data structures within the key-value storage system 102.

Figure 3:
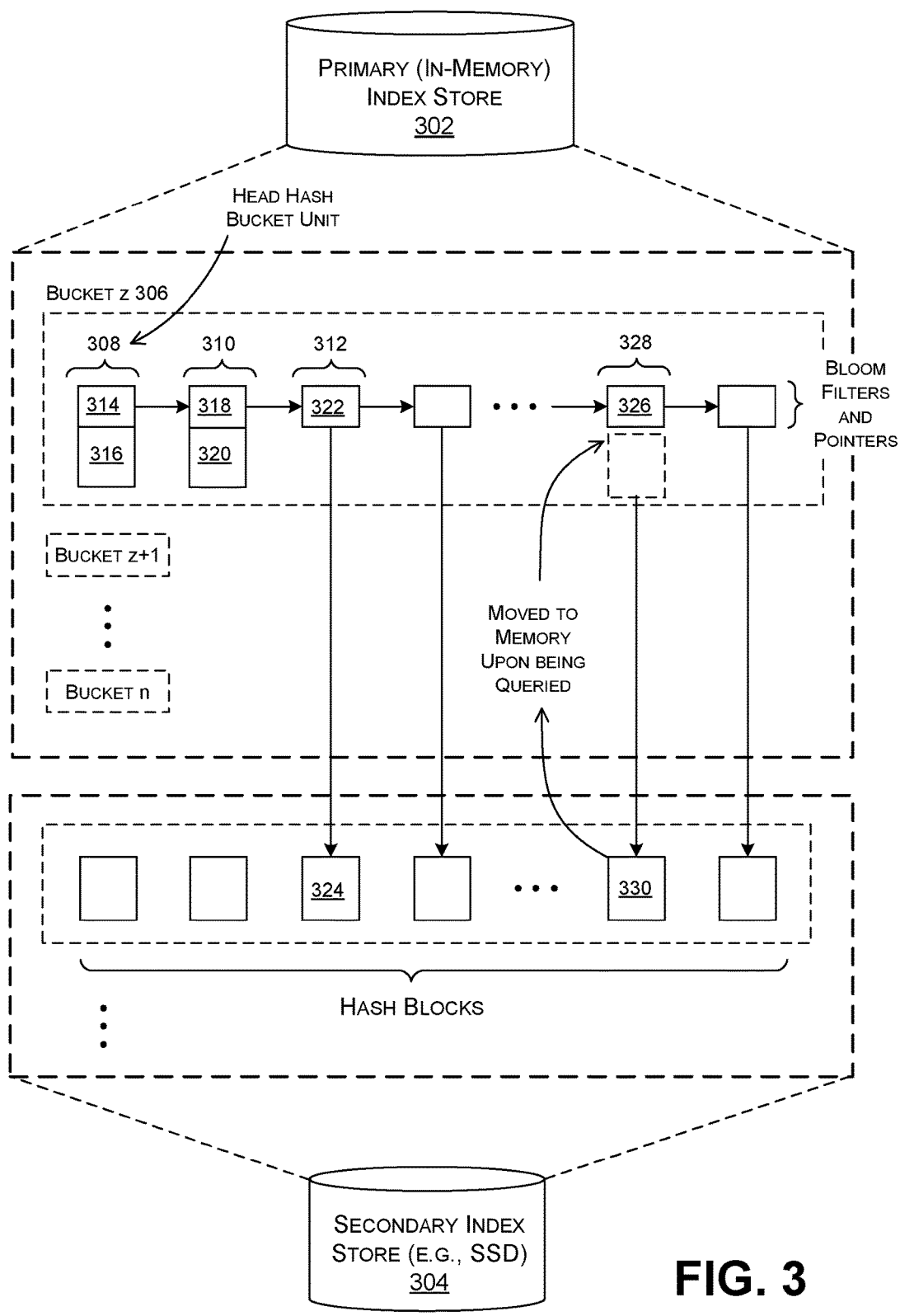
FIG. 3 shows one way in which the key-value storage system can distribute hash entries between an in-memory index store and a secondary index store.

FIG. 3 shows one manner by which the key-value storage system 102 of FIG. 1 distributes hash blocks between an in-memory (primary) index store 302 and a secondary index store 304. Recall that the secondary index store 304 may correspond to a hard disk storage mechanism, a solid-state storage mechanism, etc., or combination thereof. FIG. 3 particularly depicts the composition of one illustrative hash bucket 306. Other hash buckets, although only depicted in summary form in FIG. 3, have a similar composition.

The illustrative hash bucket 306 includes a linked list of hash bucket units. That is, the hash bucket 306 includes a first (head) hash bucket unit 308, a second hash bucket unit 310, a third hash bucket unit 312, and so on. The head hash bucket unit 308 includes an in-memory head bloom filter 314 and an in-memory head hash block 316. Likewise, the second hash bucket unit 310 includes an in-memory bloom filter 318 and an in-memory hash block 320. But at the present time, the third hash bucket unit 312 stores just a bloom filter 322 in the in-memory index store 302; the third hash bucket unit 312 stores its corresponding hash block 324 in the secondary index store 304 (not, at this time, in the in-memory index store 302). Remaining hash bucket units have the same configuration as the third hash bucket unit 312.

More specifically, in one implementation, the insertion component 114 (of FIG. 1) adds each new hash entries to the head hash bucket unit 308 until its corresponding head hash block 316 is full and cannot accommodate the storage of additional hash entries. Upon an indication that the head hash block 316 is full, the insertion component 114 creates a new hash bucket unit and adds that new hash bucket unit to the beginning of the linked list of hash bucket units. In other words, this new hash bucket unit assumes the role of a new head hash bucket unit having an associated new head hash block. As a result, the key-value storage system 102 can be said to store new hash entries across a hash bucket's hash blocks in a generally chronological order based on the order in which they were inserted into the index 108. For instance, hash entries in a hash bucket unit near the tail of the linked list correspond to older entries compared to hash entries in a hash bucket unit near the head of the linked list.

As will be explained in greater detail in Section B, a linked list can also store hash entries that represent different versions of a key-value entry, associated with a same key. A hash entry that represents a current version of the key-value entry will occur closer to the head of the linked list compared to hash entry representing an older version of the key-value entry.

The key-value storage system 102 manages each hash bucket such that, at any given time, at least n of its most recently created hash bucket units have their respective hash blocks stored in the in-memory index store 302. The remainder of the hash bucket units has their respective hash blocks stored in the secondary index store 304. Without limitation, in the example of FIG. 3, n=2 because hash bucket unit 308 and hash bucket unit 310 have their respective hash blocks (316, 320) stored in the in-memory index store 302. As noted above, this storage strategy helps reduce the amount of memory required by the key-value storage system 102 at any given time.

The key-value storage system 102 stores the n most recently created hash blocks in the in-memory index store 302 because there is an increased possibility that the store interaction component 104 will be interacting with these hash blocks, as opposed to older hash blocks. For example, the key-value storage system 102 stores the head hash block 316 in the in-memory index store 302 because the key-value storage system 102 will repeatedly interact with the head hash block 316 by adding new hash entries to it, until it is full.

The store interaction component 104 can also temporally move any hash block from the secondary index store 304 to the in-memory index store 302 when the query component 116 seeks to interact with it. For example, assume that the query component 116 seeks to find a key-value entry corresponding to a specified full key. As will be described more fully in Section B, the query component 116 can first determine the hash bucket to which the full key corresponds. Assume that it corresponds to the hash bucket 306 of FIG. 3. The query component 116 can then successively test each bloom filter of each respective hash bucket unit, starting with the head hash bucket unit 308, until it finds a match (if any). Assume that the query component 116 determines that a bloom filter 326 of a nineteenth hash bucket unit 328 provides a match, indicating that its corresponding hash block 330 may store a hash entry being sought, subject to a small false positive probability. At this juncture, the store interaction component 104 can retrieve the hash block 330 from the secondary index store 304 and store it in the in-memory index store 302. The query component 116 then proceeds to process the hash entries in the hash block 330 to determine if the hash entry being sought is included within the hash block 330.

The store interaction component 104 can use different strategies for determining how long a queried hash block will remain in the in-memory index store 302. In one case, the store interaction component 104 marks an in-memory hash block to be discarded immediately after a query has been completed. In another case, the store interaction component 104 marks an in-memory hash block for removal a prescribed amount of time after a query has been completed. This latter strategy may be appropriate in those application-specific environments in which there is a heightened probability that the query component 116 will soon make another query directed to the same hash block. The same is true with respect to a former head hash block; the storage interaction component 104 can immediately discard the former head hash block from the in-memory index store 302 when a new head hash block has been created, or some configurable time thereafter.

Figure 4:
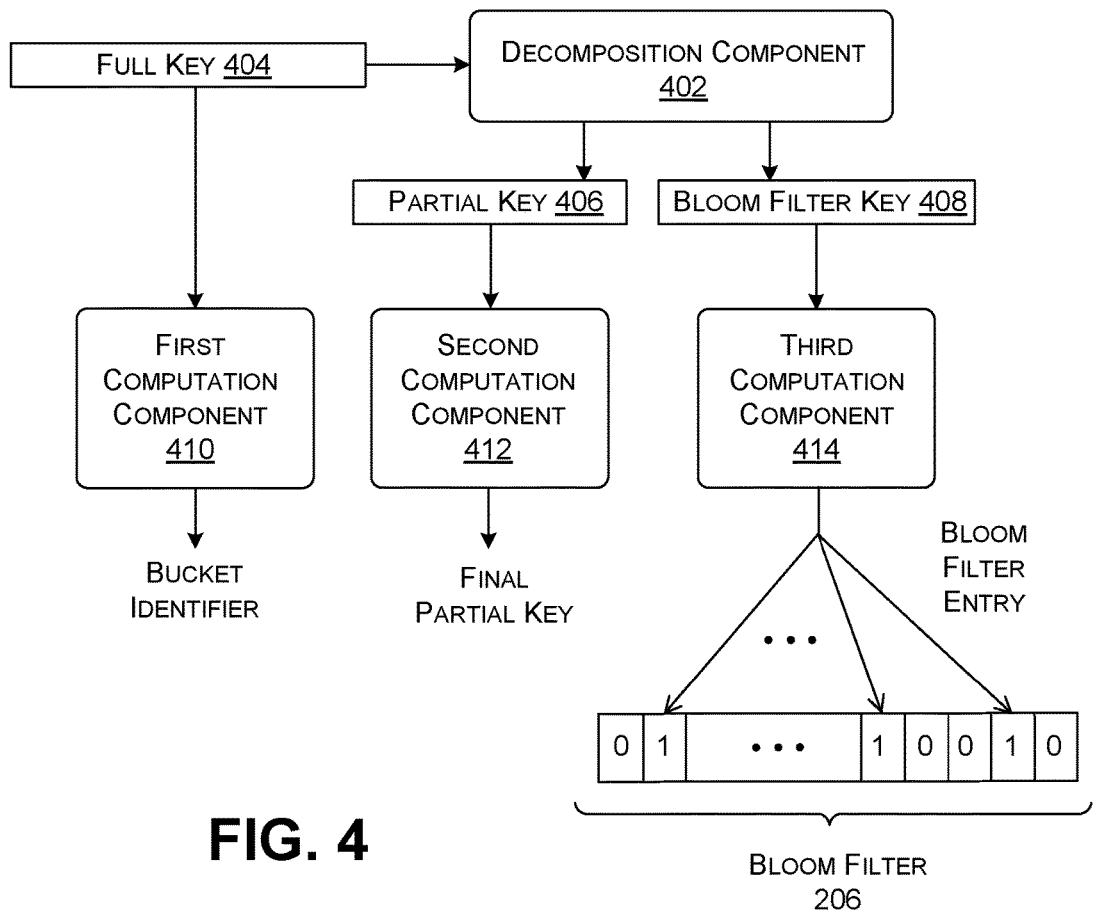
FIG. 4 shows functionality for computing various key-related values, for use in the key-value storage system of FIG. 1.

FIG. 4 shows functionality for computing various key-related values that are used by the key-value storage system 102 of FIG. 1. In one case, the store interaction component 104 can implement the functionality as a library of common resource components. The insertion component 114, query component 116, and R&E component 118 can rely on these resource components in performing their respective operations.

As a first operation, a decomposition component 402 can split a full key 404 under consideration into to two parts, corresponding to an initial partial key 406 and a bloom filter key 408. For example, assume that the full key 404 includes x units of information (e.g., x bits). The decomposition component 402 can use the first half of those units of information to create the initial partial key 406, and the second half of those units of information to create the bloom filter key 408.

A first computation component 410 uses a hash function to hash the full key 404 to produce a hash bucket identifier. The hash function can be implemented using any algorithm, such as a cyclic redundancy check (CRC) algorithm, any kind of cryptographic hash algorithm (e.g., MD5, SHA-1), etc.

A second computation component 412 can optionally use any hash function to hash the initial partial key 406 to produce a hash result. In addition, the second computation component 412 can truncate the hash result to correspond to a particular size, to produce a final partial key. The final partial key has a reduced size (e.g., having a size of 27 bits) compared to the full key 404 (e.g., having a size of 128 bits). Other implementations can produce the final partial key in alternative ways. For example, another implementation can use the initial partial key as the final partial key, without modification. Hence, as used herein, the term "partial key" represents any item of information that is derived from the full key 404 in any manner, and which has a smaller size compared to the full key 404.

A third computation component 414 uses a set of k independent hash functions to hash the bloom filter key 408 to produce a bloom filter entry. Each of the k hash functions maps the bloom filter key 408 to a particular cell location within a set of m cell locations within the bloom filter 206.

More specifically, the third computation component 414 can work in cooperation with both the insertion component 114 and the query component 116. In a first scenario, assume that the insertion component 114 invokes the third computation component 414 to add a new bloom filter entry to the bloom filter 206. Here, the third computation component 414 applies the k hash functions to the bloom filter key 408 to determine a set of k cell locations in the bloom filter 206, and then sets the values of those cells to 1 (presuming that, by default, each cell value is initially set to 0 until it is modified).

In a second scenario, assume that the query component 116 invokes the third computation component 414 to determine whether the bloom filter 206 already represents the particular bloom filter key 408. Here, the third computation component 414 applies the k hash functions to the bloom filter key 408 to determine a set of k cells in the bloom filter 206. The third computation component 414 then determines whether each of those k cells has a value of 1. If at least one of the k cells has a zero value, then the query component 116 conclusively determines that the bloom filter 206 does not match the bloom filter key 408 (meaning there is no possibility of a false negative). If all of the k cells have the value of 1, then the query component 116 determines that the bloom filter 206 matches the bloom filter key 408, subject to a prescribed probability that a false positive has occurred (which is typically very low).

Note that the data structure 122 can use other types of set membership filters besides a bloom filter. In general, a set membership filter represents a set of set membership keys in any manner. It further provides a way of determining whether a specified set membership key is included within the set. Alternative set membership techniques (besides a bloom filter technique) include, without limitation, dictionary-based techniques, hash compaction techniques, cuckoo filter techniques (which involves the use of cuckoo hashing), etc.

More generally, note that the functionality of FIG. 4 computes the final partial key and the bloom filter entry based on the same full key 404. But the second computation component 412 and the third computation component 414 perform their respective operations (e.g., their respective hashing operations) in an independent manner.

Figure 5:
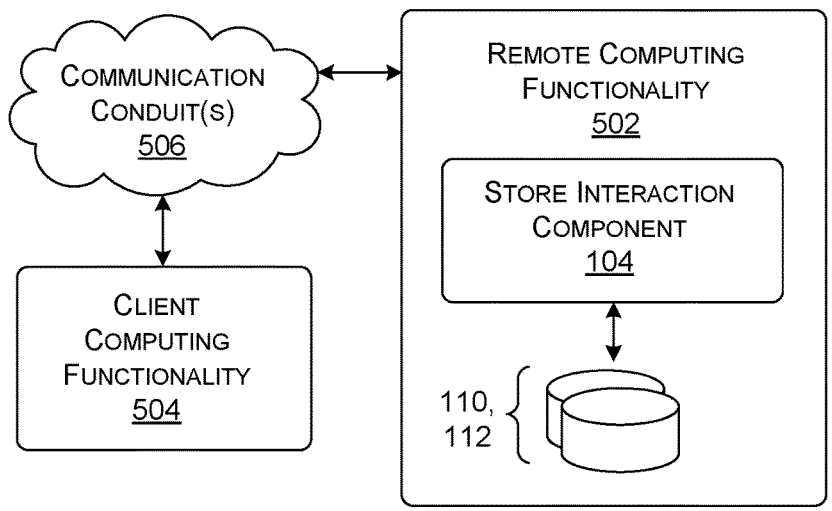
FIG. 5 shows computer-related equipment for implementing the key-value storage system of FIG. 1, according to one implementation.

FIG. 5 shows computer equipment for implementing the key-value storage system 102 of FIG. 1, according to one implementation. In this case, remote computing functionality 502 provides a network-accessible storage-related service (e.g., a cloud storage service). The storage-related service can include all of the features shown in FIG. 1, including the store interaction component 104 and the data stores (110, 112) used to implement the content store 106 and the index 108. From a physical perspective, the remote computing functionality 502 can be implemented using one or more server computing devices and any other computer-related equipment (e.g., routers, etc.).

Any client computing functionality 504 can interact with the remote computing functionality 502 via a communication conduit 506. In one scenario, the client computing functionality 504 can correspond to a user computing device of any type. A user may interact with the remote computing functionality 502 using the client computing functionality 504 to store information, retrieve information, etc. In another scenario, the client computing functionality 504 can correspond to some server computing device (or devices) associated with any type of system. For example, the client computing functionality 504 can correspond to another network-accessible service that performs a process that, as part thereof, involves interaction with the storage service provided by the remote computing functionality 502. The communication conduit 506 can correspond to a wide area network (e.g., the Internet), a local area network, a peer-to-peer network of any type, one or more point-to-point links, etc.

In another implementation, at least some of the features of the key-value storage system 102 can be distributed between remote computing functionality 502 and the client computing functionality 504 in any manner. In another implementation, the client computing functionality 504 implements a separate instance of all of the functionality associated with the key-value storage system 102, thereby entirely eliminating the use of the remote computing functionality 502.

B. Illustrative Processes

FIGS. 6-7 and 9-12 show processes that explain the operation of key-value storage system 102 of Section A in flowchart form. Since the principles underlying the operation of the key-value storage system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

Figure 6:
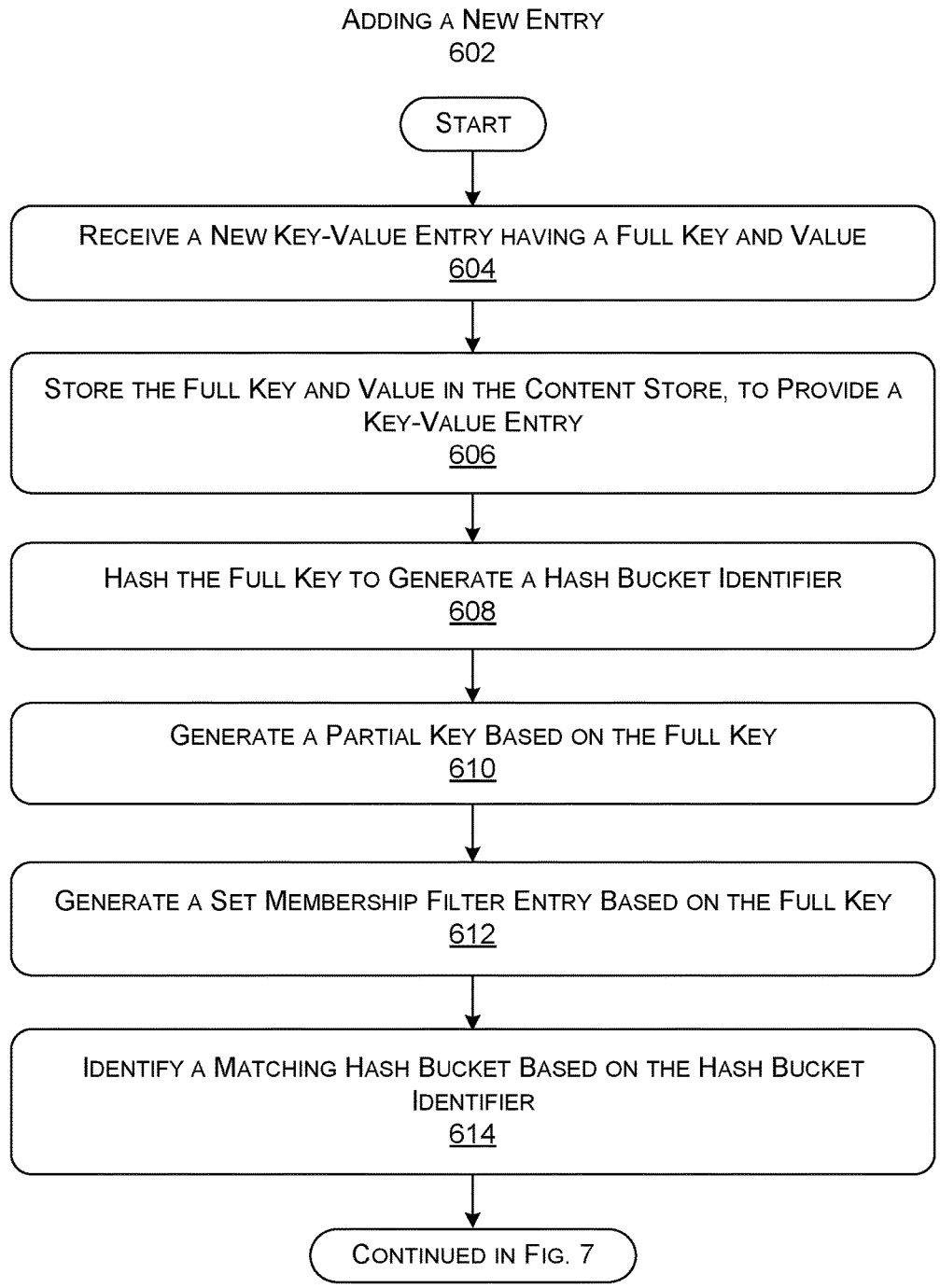
FIGS. 6 and 7 together show a process for adding a new key-value entry to the key-value storage system of FIG. 1.
Figure 7:
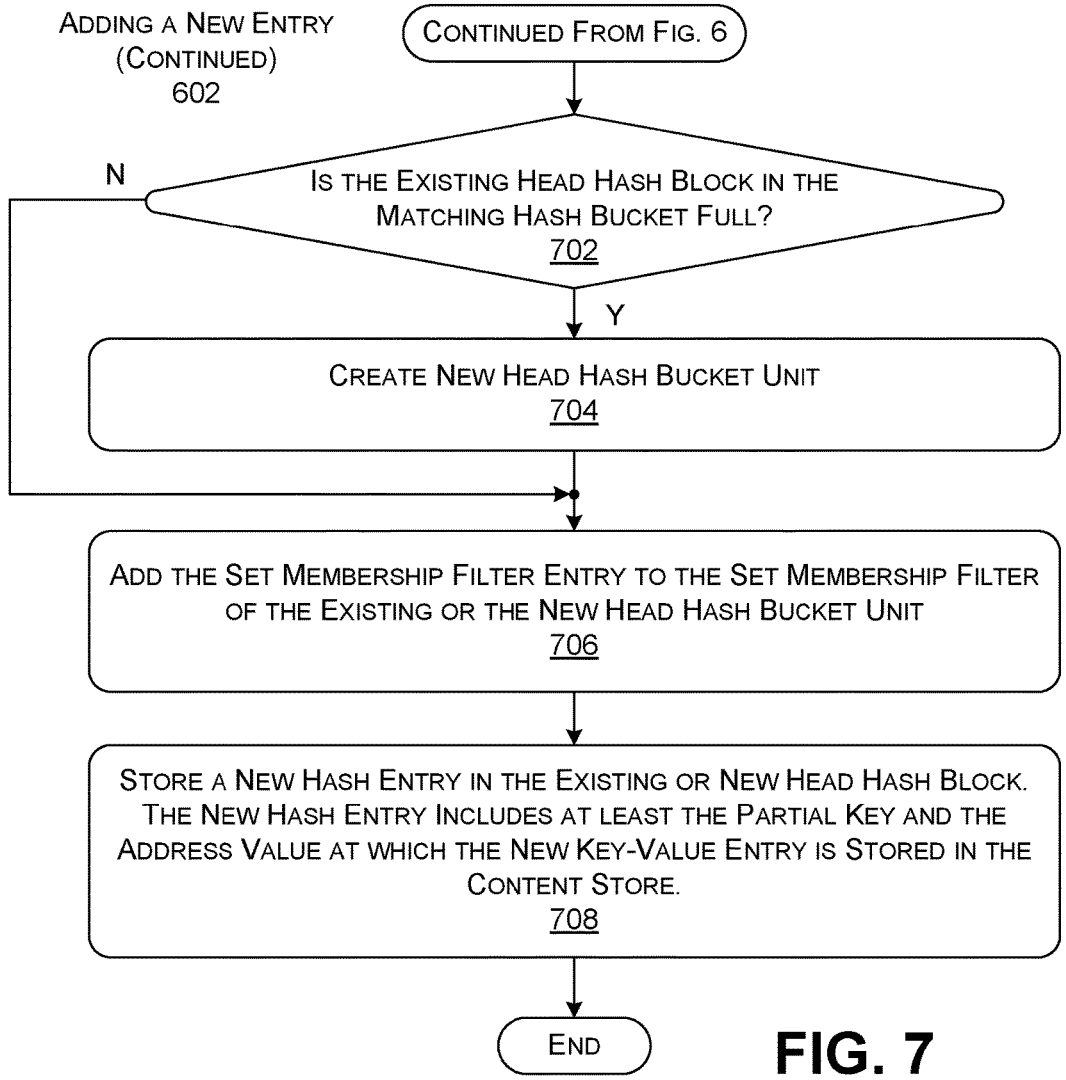

FIGS. 6 and 7 together show a process 602 for adding a new key-value entry to the key-value storage system 102 of FIG. 1. In block 604, the insertion component 114 receives a full key and a value associated with the new key-value entry. In block 606, the insertion component 114 stores the full key and value in the content store 106, to provide a new key-value entry. In block 608, the insertion component 114 hashes the full key to generate a hash bucket identifier. In block 610, the insertion component 114 generates a partial key based on the full key. In block 612, the insertion component 114 generates a set membership filter entry (e.g., a bloom filter entry) based on the full key. Section A, with reference to FIG. 4, explained illustrative techniques for performing blocks 608-612. In block 614, the insertion component 114 identifies a matching hash bucket (if any) based on the hash bucket identifier computed in block 608.

Advancing to FIG. 7, in block 702, the insertion component 114 determines whether an existing head hash block, included within a head hash bucket unit in the matching hash bucket, is full. In block 704, the insertion component 114 creates a new head hash bucket unit, having a new set membership filter and a new hash block, if the existing head hash bock is full. In block 706, the insertion component 114 adds the set membership filter entry (computed in block 612) to the set membership filter of the new head hash bucket unit (if it has been created), else the insertion component 114 adds it to the existing head hash bucket unit. In block 708, the insertion component 114 stores a new hash entry to the new head hash block (if it has been created), else the insertion component 114 stores it in the existing head hash block. The new hash entry includes at least the partial key (computed in block 610) and an address value at which the new key-value entry is stored in the content store 106.

Figure 8:
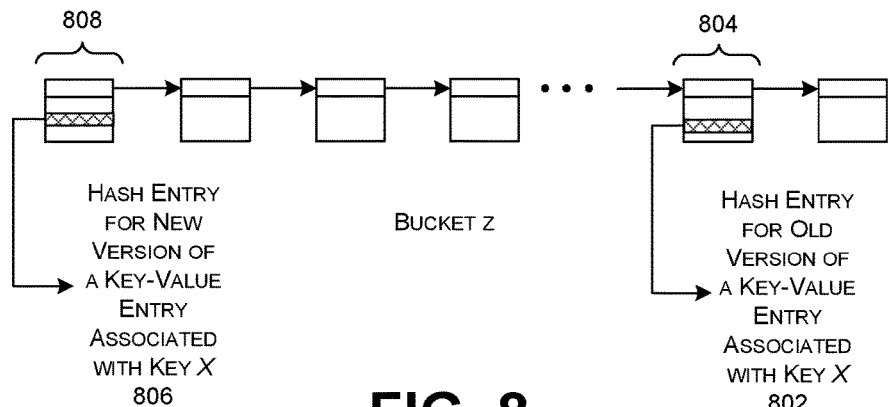
FIG. 8 shows one manner of using the index to preserve the respective locations of different versions of a key-value entry, the different versions being associated with a same key.

FIG. 8 illustrates how the process 602 of FIG. 6 operates to add different hash entries in a hash bucket, corresponding to different respective versions of a key-value entry provided in the content store 106. Each hash entry, corresponding to a different version of the key-value entry, is associated with a same key, e.g., key X.

More specifically, assume that the insertion component 114 stores a first hash entry 802 corresponding to a first version of the key-value entry in a hash bucket unit 804. The first hash entry 802 includes an address value which points to the location of the first version of the key-value entry in the content store 106. At the time of the insertion of the first hash entry 802, assume that the hash bucket unit 804 represented the head hash bucket unit of the linked list. But at the present time, assume that the hash bucket unit 804 is no longer the head hash bucket unit because subsequent hash bucket units have been added to the beginning of the linked list, after the insertion of the first hash entry 802.

In a more recent operation, assume that the insertion component 114 stores a second hash entry 806 (corresponding to a second version of the key-value entry) in a hash bucket unit 808. The hash bucket unit 808 represents the head hash bucket unit at a current time. The second hash entry 806 includes an address value which points to the location of the second version of the key-value entry in the content store 106. In this case, the insertion component 114 adds the second hash entry 806 to the hash bucket unit 808 because that hash bucket unit is the head of the linked list (and because all new hash entries are stored in the head hash bucket unit, even those corresponding to revisions of a previously stored key-value entry).

Overall, observe that any linked list of hash bucket units reveals the approximate timing at which revisions were made to a key-value entry based on the locations of the corresponding hash entries in the linked list. As described below, the store interaction component 104 can also leverage the above-described manner of storing different versions by selectively retrieving a desired version of a key-value entry from the content store 106.

The insertion component 114 can also use the process 602 of FIGS. 6 and 7 to delete an entry from the content store 106, and to make a corresponding update to the index 108. To do so, the insertion component 114 adds a new key-value entry to the content store 106 that has the correct key as the entry being deleted, but with an empty value (corresponding to any value associated by definition with an empty result). The insertion component 114 updates the index 108 in the same manner described above to reflect the new version of key-value entry that has been added to the content store 106.

Figure 9:
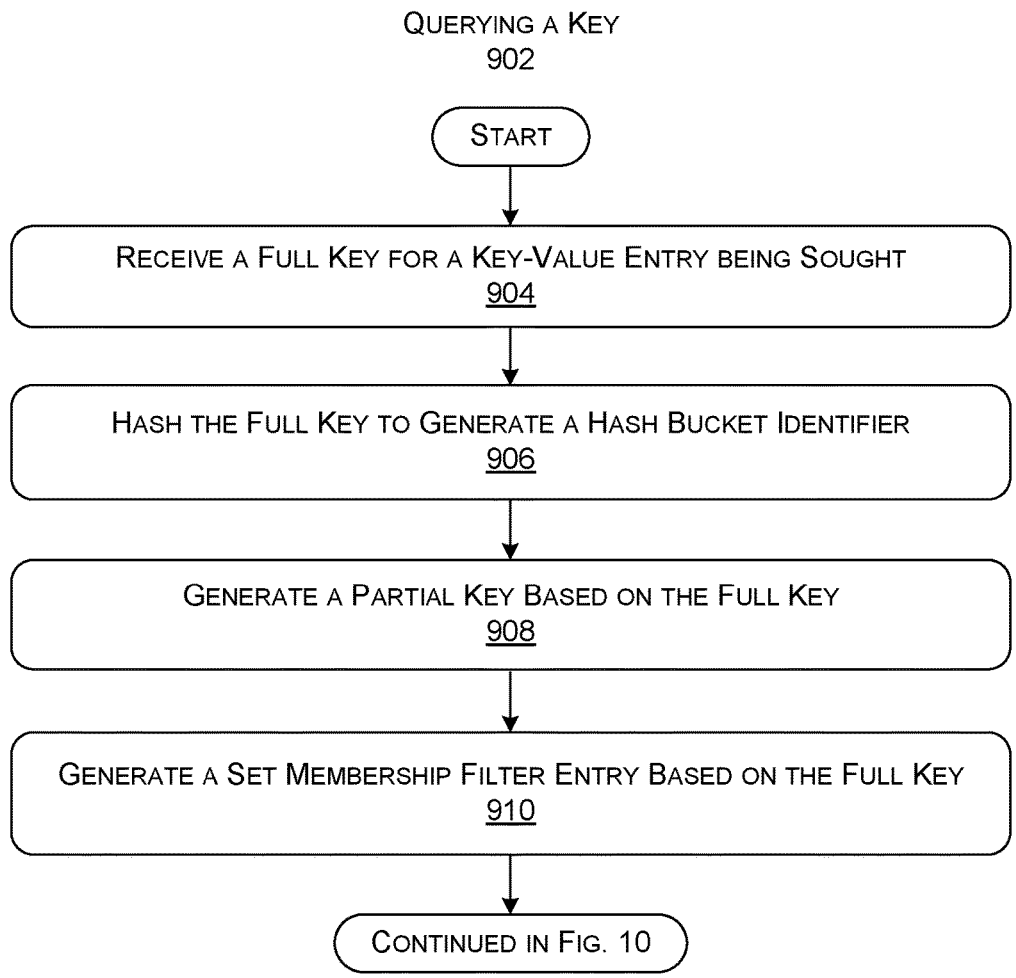

FIGS. 9-11 together show a process 902 for querying a key of a sought-after key-value entry using the key-value storage system 102 of FIG. 1. In block 904, the query component 116 receives a full key associated with the sought-after key-value entry. In block 906, the query component 116 hashes the full key to generate a hash bucket identifier. In block 908, the query component 116 generates a partial key based on the full key. In block 910, the query component 116 generates a set membership filter entry (e.g., a bloom filter entry) based on the full key. Again, Section A (with reference to FIG. 4) describes one technique for performing operations 906-910.

Advancing to FIG. 10, in block 1002, the query component 116 identifies a matching hash bucket based on the hash bucket identifier. In block 1004, the query component 116 identifies a matching hash bucket unit by comparing the set membership filter entry (computed in block 910) to each set membership filter in the matching hash bucket until a match is found, if any. The matching hash bucket includes an associated matching hash block.

In block 1006, the query component 116 determines whether the matching hash block is provided in the in-memory index store 302. In block 1008, the query component 116 retrieves the matching hash block from the secondary index store 304 and stores the matching hash block in the in-memory index store 302 if it is not already in the in-memory index store 302. In block 1010, the query component 116 identifies a matching hash entry, if any, in the matching hash block, by comparing the partial key (computed in block 908) of the sought-after key-value entry with each hash entry in the matching hash block.

There is a chance that the matching hash block does not including a matching hash entry, e.g., because the corresponding set membership filter is subject to false positives. If block 1010 terminates in a failure to find the matching hash entry, then the process flow returns to block 1004, where the query component 116 moves on to examine the next hash bucket unit. If the last hash bucket unit is reached without encountering a matching hash entry, then the process 902 terminates with an indication that the sought-after key-value entry could not be found. But assume in this example that block 1010 successfully identifies a matching hash entry.

Advancing to FIG. 11, in block 1102, the query component 116 retrieves a key-value entry from the content store 106 that matches an address value specified by the matching hash entry (identified in block 1010), to provide a retrieved key-value entry. In block 1104, the query component 116 determines whether a full key associated with the retrieved key-value entry matches a full key associated with the sought-after key-value entry, as provided in block 904. In block 1106, the query component 116 continues a search within the index if the full key of the retrieved key-value entry does not match the full key associated with the sought-after key-value entry. That is, the query component 116 continues the search by returning to block 1010.

The query component 116 can implement the continued search operation in different ways. Assume that the query component 116 determines that a matching hash entry leads to a collision, meaning that it points to some key-value entry in the content store 106 other than the sought-after key-value entry. The query component 116 can flag the matching hash entry as being invalid, e.g., by storing its address value in an invalid entry store, indicating that this address value points to an incorrect hash-value entry. The query component 116 can then re-perform the search operation. Upon retry, the query component 116 will first encounter the same previously-identified hash entry. The query component 116 can then consult the invalid entry store to determine that the previously-identified matching hash entry does not correspond to the correct sought-after key value entry. At this juncture, the query component 116 continues its search within the matching hash bucket, past the previously-identified matching hash entry. That is, the query component 116 will first continue the search by looking at hash entries in the matching hash bucket unit past the previously-identified matching hash entry. If another matching hash entry is not found, the query component 116 will then advance to examine the hash entries associated with a next matching hash block (if any), and so on.

In some implementations, a garbage collection process (performed by the garbage collection functionality 120 of FIG. 1) can operate on the content store 106 by deleting hash entries and moving hash entries to new locations. As will be described below with reference to FIG. 12, the R&E component 118 can make complementary updates to the index 108. These garbage collection operations pose a risk that the index 108 will no longer contain an address value that has been previously flagged as being invalid. The query component 116 can address this situation by re-performing the search for a sought-after key-value entry from anew, that is, without any previous knowledge of any previously-identified matching hash entry. The query component 116 can take this approach whenever it learns that the R&E component 118 has modified the index 108 such that previously identified invalid address values may no longer appear in the index 108, or if they do appear, may no longer point to invalid key-value entries.

The query component 116 can also be configured to retrieve one or more specific versions of a key-value entry. For example, assume there are three version of a key-value entry stored in the content store 106, created at different respective times, and that there are three corresponding hash entries in the index 108 for those three versions. Further assume that a caller wishes to retrieve the oldest version, e.g., corresponding to the first version. The query component 116 can retrieve the desired version by examining the hash blocks from newest to oldest in the above-described manner. In doing so, the query component 116 will first encounter a matching hash entry associated with the third (and most recent) version. The query component 116 will ignore this version after verifying that it does indeed correspond to the correct third version, e.g., by checking the counterpart full key in the content store 106. Upon continuing the search, the query component 116 will next encounter a matching hash entry associated with the second version. Again, the query component 116 will ignore this matching hash entry after verifying that it does indeed correspond to the correct second version. Upon continuing the search, the query component 116 will finally encounter the matching hash entry associated with the desired first version. The query component 116 will then retrieve the key-value entry specified by the address value of the final matching hash entry, after verifying that this entry corresponds to the sought-after key-value entry.

In another scenario, a caller can request retrieval of any two or more (including all) versions of a key-value entry. The query component 116 will perform the same operations as above, but in this case, the query component 116 will retrieve plural key-value entries.

Figure 12:
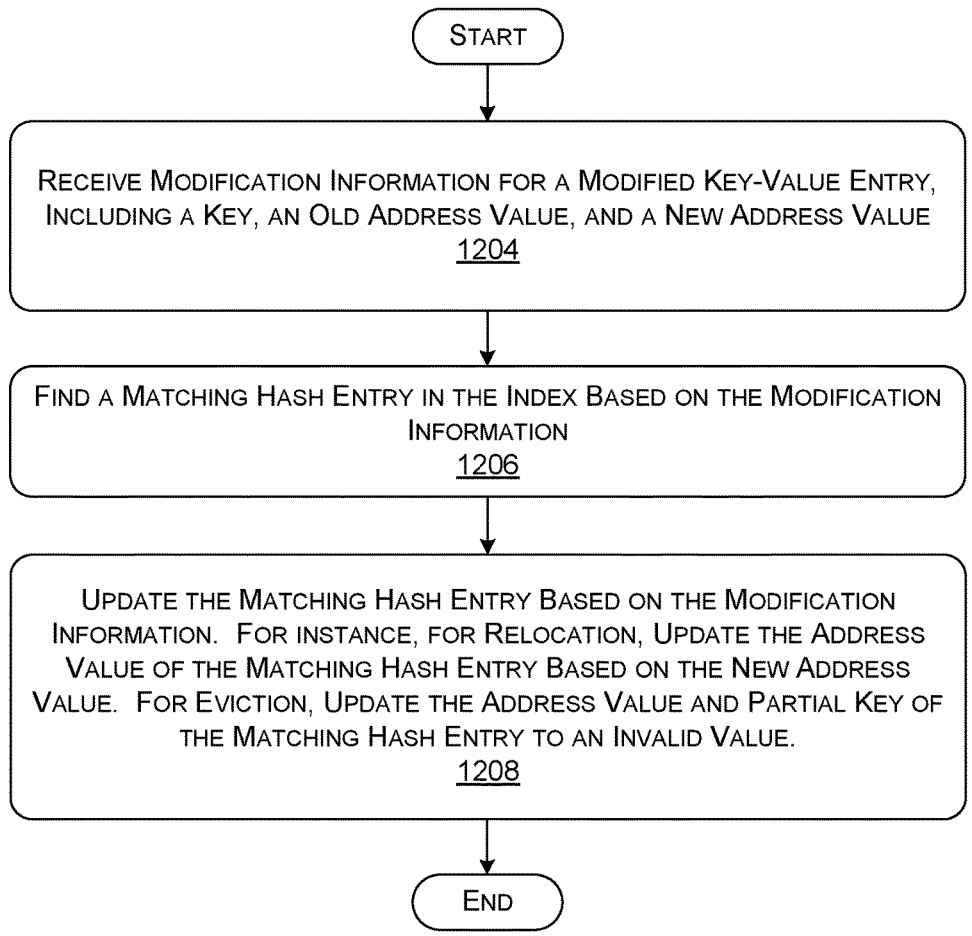
FIG. 12 shows a process for updating the index of FIG. 1 to account for a garbage collection process.

FIG. 12 shows a process 1202 for updating the index of FIG. 1 to account for a garbage collection process. The garbage collection functionality 120 (of FIG. 1) can perform the garbage collection process on a periodic and/or event-driven basis to relocate at least some key-value entries in the content store 106 and/or to evict at least some key-value entries in the content store 106. The garbage collection functionality 120 performs this task to get rid of deleted and overwritten key-value entries. By doing so, the garbage collection functionality 120 creates storage space for accommodating new key-value entries. The R&E component 118 complements this garbage collection process by making appropriate changes to the index 108 to account for changes made to the content store 106.

In block 1204, the R&E component 118 receives modification information from the garbage collection functionality 120 with respect to at least one modified key-value entry. The modified key-value entry corresponds to a particular key-value entry in the content store 106 that has been modified by the garbage collection functionality 120. The modification information may include an old address value associated with the particular key-value entry, a new address value associated with the particular key-value entry, and a key associated with the particular key-value entry. In block 1206, the R&E component 118 uses the modification information to find a matching hash entry in the index 108. In block 1208, the R&E component 118 updates the matching hash entry based on the modification information.

The R&E component 118 performs block 1206 by using the specified key to find a matching hash entry in the same manner described above with respect to the process 902. In this case, however, the R&E component 118 can verify that the matching hash entry is correct (and not the result of a collision) by determining whether the address value associated with the matching hash entry matches the old address value given by the modification information. This determination is conclusive, such that the R&E component 118 does not need to retrieve any information from the content store 106. If there is a mismatch between the old address value and the address value associated with the matching hash entry, the R&E component 118 can continue its search for the next matching hash entry.

Figure 13:
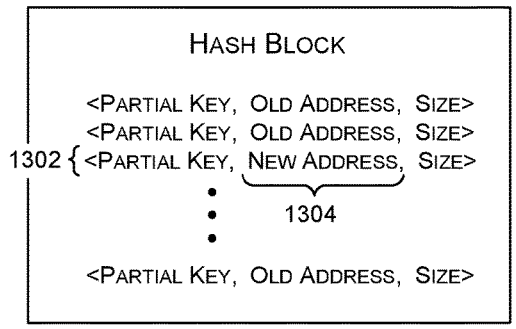
FIG. 13 shows an outcome of the process of FIG. 12 for a key-value entry that has been moved within the content store due the garbage collection process.

FIG. 13 shows an outcome of the process of FIG. 12 for a particular key-value entry that has been moved within the content store 106. More specifically, assume that the garbage collection process moves a particular key-value entry in the content store 106 from an old location in the content store 106, associated with an old address value, to a new location in the content store 106, associated with a new address value. The R&E component 118 updates the matching hash entry 1302 by changing an address value 1304 specified by the matching hash entry 1302 (associated with the old location) to the new address value associated with the new location. In other words, the R&E component 118 updates the matching hash entry 1302 in place within its hash block.

Figure 14:
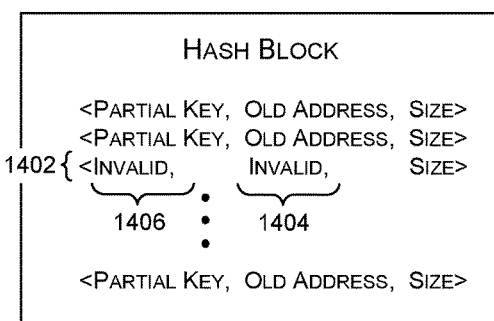
FIG. 14 shows an outcome of the process of FIG. 12 for a key-value entry that has been evicted from the content store due to the garbage collection process.

FIG. 14 shows an outcome of the process of FIG. 12 for a particular key-value entry that has been evicted from the content store due to the garbage collection process. In this case, the R&E component 118 sets the new address value to an invalid value to indicate that the new address value is invalid. An "invalid value" refers to any value that will subsequently be interpreted as invalid by default. Further, the R&E component 118 updates a matching hash entry 1402 by changing an address value 1404 specified by the matching hash entry 1402 to correspond to the invalid value. In addition, the R&E component 118 can update a partial key 1406 of the matching hash entry 1402 to correspond to an invalid value. By doing so, the R&E flags the matching hash entry 1402 for subsequent removal by the R&E component 118.

The R&E component 118 (or some other process) can perform a subsequent compaction or clean-up process to purge the index 108 of invalid hash entries. The R&E component 118 can perform this task on a periodic basis or an event-driven basis. In one approach, the R&E component 118 can create a new linked list of hash bucket units for each hash bucket. The R&E component 118 can then copy over all the valid hash entries from the first version of the linked list to the new version of the linked list, omitting any invalid hash entries. The R&E component 118 also updates the bucket index 126 such that it includes pointers to the respective heads of the new linked lists.

Note that the R&E component 118 reacts to actions taken by the garbage collection functionality 120, but is otherwise agnostic with respect to (and independent of) the nature of the garbage collection process that is performed by the garbage collection functionality 120. In other words, the R&E component 118 can work with any garbage collection process, so long as it is informed by the garbage collection process of the changes it has made to the key-value entries in the content store 106.

As a final topic in this section, the key-value storage system 102 of FIG. 2 includes various parameters that can be tuned to ensure desired performance. Performance is gauged from the standpoint of at least memory consumption, speed of operation, and processing load. The parameters can include, but are not limited to: the number of hash buckets; the maximum number of hash bucket units associated with each hash bucket; the maximum number of hash entries per hash block; the number of hash blocks that are stored in the in-memory index store 302 at any given time; the size of each partial key value; a false positive probability associated with each individual set membership filter; a false positive probability associated with a hash bucket's entire collection of set membership filters; a block collision probability associated with the process of matching a partial key against hash entries within a particular hash block, etc.

With respect to the topic of false positive probability, a filter-specific false positive probability represents the chance that each individual set membership filter will provide a false positive result. For a bloom filter, the filter-specific false positive probability approximately corresponds to $(1-e^{-kn/m})^k$ where m is the number of cell locations in the bloom filter 206, n is the number of bloom keys represented by the bloom filter 206, and k is the number of hash functions used to produce each bloom filter entry. The overall false positive probability corresponds to the binomial probability that at least one of the bloom filters within a hash bucket will provide a false positive result. According to one configuration, the key-value storage system 102 can ensure that no more than 1% of queries will produce a false positive outcome by using a maximum of 20 hash bucket units per hash bucket, together with a 1 KB bloom filter that represents a maximum of 512 bloom filter entries and has a filter-specific false positive probability of less than 0.05%.

The block collision probability refers to a chance that a given partial key will produce at least one false match with respect to any hash entry in a hash block. The collision probability can be computed based on the following formula:

$$\text{collision probability} = 1 - \left(1 - \left(\frac{1}{2^\alpha}\right)\right)^\beta.$$

α corresponds to the size of a partial key. β corresponds to a number of hash entries in a hash block. For example, for α=27 bits and β=512 hash entries, the block collision probability corresponds to false match rate of less than 0.05%.

Different parameters affect performance in different ways. For example, the size of the partial key and the number of hash blocks in memory at any given time influence the memory consumption of the key-value storage system 102. The overall false positive probability and the block collision probability influence the speed of operation of the key-value storage system 102 and the processor load imposed by the key-value storage system 102; this is because any instance of false matching slows the key value storage down and consumes processing cycles.

Moreover, note that a change that decreases the utilization of memory (which is desirable) can create undesirable changes to processing speed and processor load, and vice versa. For example, a developer may decrease the size of each partial key, but doing so increases the collision rate of the key-value storage system 102, which, in turn, slows down the operation of the key-value storage system 102. A developer can choose a particular combination of parameter values to achieve a desired consumption of resources to suit the demands of a particular environment.

Further note that the key-value storage system 102 described above does not involve sorting of keys, which is a common component of many conventional key-value storage systems. Because of this, the key-value storage system 102 can eliminate the processing cycles that would otherwise go into the sorting operation. This results in an increase in processing speed and a decrease in processing load. But note that it is also possible to combine the key-value storage system 102 with key-sorting functionality. In other words, the key-value storage system does not preclude a sorting operation, although it can operate at faster speeds without the sorting operation.

C. Representative Computing Functionality

Figure 15:
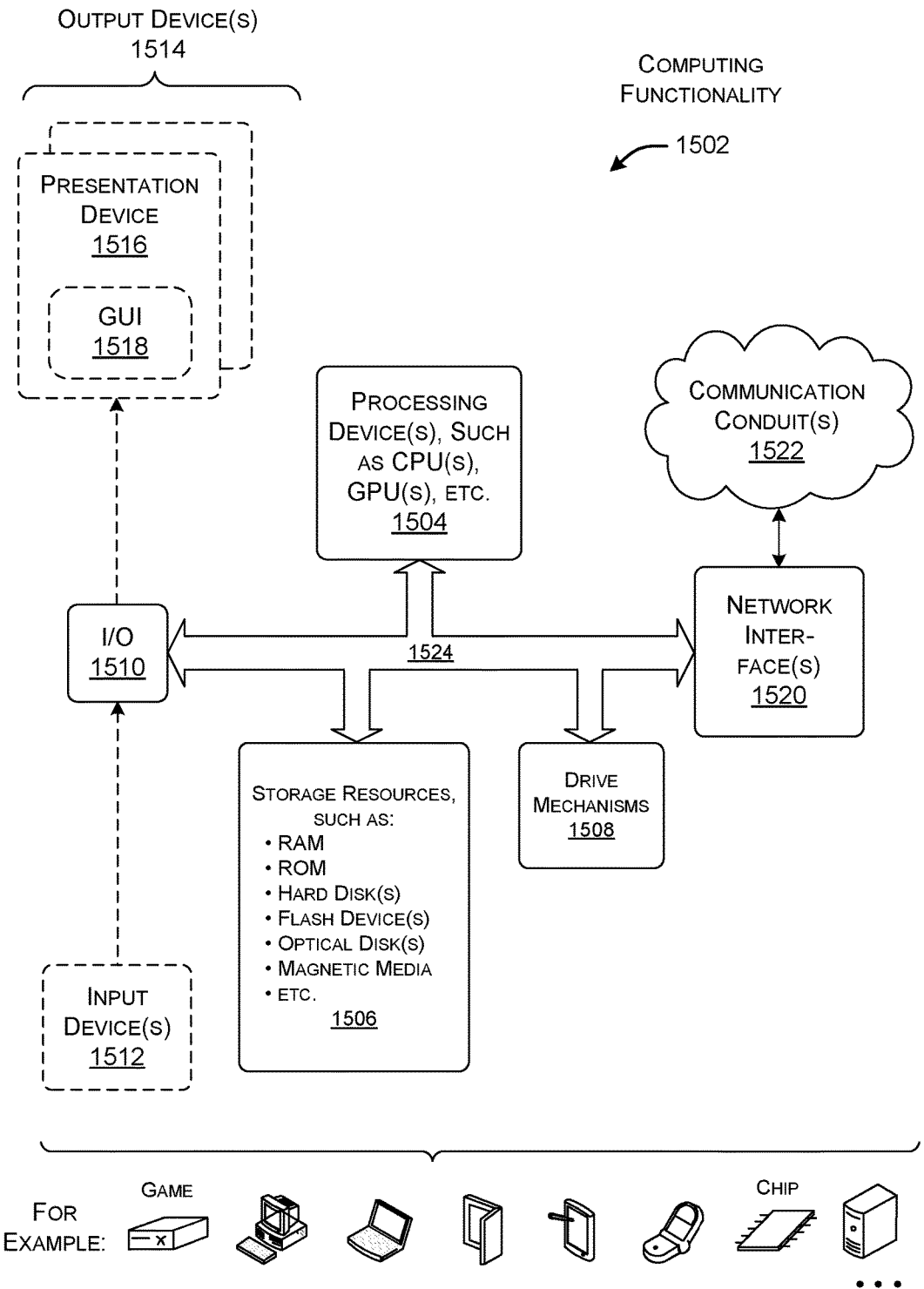
FIG. 15 shows illustrative computing functionality that can be used to implement any aspect of the features shown in the foregoing drawings.

FIG. 15 shows computing functionality 1502 that can be used to implement any aspect of the mechanisms set forth in the above-described figures. For instance, the type of computing functionality 1502 shown in FIG. 15 can be used to implement any of the remote computing functionality 502 (such as a server computing device), the client computing functionality 504 of FIG. 5 (such as a user computing device), etc. Note, however, that the set of features described in FIG. 15 is illustrative, and that any particular manifestation of the computing functionality 1502 can omit one or more of the features shown in FIG. 15, and/or add one or more features that are not illustrated in FIG. 15. In all cases, the computing functionality 1502 represents one or more physical and tangible processing mechanisms.

The computing functionality 1502 can include one or more hardware processor devices 1504, such as one or more central processing units (CPUs), and/or one or more graphical processing units (GPUs), and so on. The computing functionality 1502 can also include any storage resources (also referred to as computer-readable storage media or computer-readable storage medium devices) 1506 for storing any kind of information, such as machine-readable instructions, settings, data, etc. Without limitation, for instance, the storage resources 1506 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1502. The computing functionality 1502 may perform any of the functions described above when the hardware processor device(s) 1504 carry out computer-readable instructions stored in any storage resource or combination of storage resources. For instance, the hardware processor device(s) 1504 can carry out computer-readable instructions to perform each of the processes described in Section B. The computing functionality 1502 also optionally includes one or more drive mechanisms 1508 for interacting with any storage resource, such as a hard disk drive mechanism, an optical disk drive mechanism, and so on.

In some user computing device manifestations, the computing functionality 1502 also includes an input/output component 1510 for receiving various inputs (via input devices 1512), and for providing various outputs (via output devices 1514). One particular output mechanism may include a display device 1516 and an associated graphical user interface presentation (GUI) 1518. In some manifestations, the computing functionality 1502 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area computer network, a wide area computer network (e.g., the Internet), point-to-point connections, etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1502 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a key-value storage system, implemented by one or more computing devices, is described herein. The key-value storage system includes a content store for storing a plurality of key-value entries, each key-value entry providing a full key and an associated value. The key-value storage system also includes an index including an in-memory index store and a secondary index store, together with a store interaction component configured to interact with the content store using the index. The index provides an index data structure that includes a plurality of hash buckets. Each hash bucket includes a collection of linked hash bucket units, and each hash bucket unit includes a set membership filter and a hash block. Each set membership filter provides a mechanism for determining whether a set membership key under consideration is associated with a corresponding hash bucket unit. Each hash block includes a plurality of hash entries. Each hash entry provides at least a partial key and an address value. Each partial key and each set membership key are derived from a full key under consideration, and each address value specifies a location of a corresponding key-value entry in the content store. The store interaction component is configured to store hash entries in a particular collection of linked hash bucket units in a chronological order based on time of creation, by storing each new hash entry in a head hash bucket unit of the particular collection, and creating a new head hash bucket unit when a previous head hash bucket unit cannot accommodate a new hash entry. Each collection of linked hash bucket units stores at least one of its most-recently-created hash blocks in the in-memory index store, and at least some of its other hash blocks in the secondary index store.

According to a second aspect, the key-value storage system is implemented, at least in part, by one or more server computing devices associated with a network-accessible storage service.

According to a third aspect, the key-value storage system is implemented, at least in part, by a user computing device.

According to a fourth aspect, the key-value storage system omits sorting functionality for sorting keys in the index.

According to a fifth aspect, each partial key and each set membership key are based on different respective portions of a full key under consideration.

According to a sixth aspect, each set membership filter corresponds to a bloom filter.

According to a seventh aspect, each hash bucket unit includes a pointer that points to a location at which its corresponding hash block is stored in the secondary index store.

According to an eighth aspect, the store interaction component includes an insertion component that is configured to store a new key-value entry in the key-value storage system. The insertion component includes: logic configured to receive a full key and a value associated with the new key-value entry; logic configured to store the full key and value in the content store, to provide the new key-value entry; logic configured to hash the full key to generate a hash bucket identifier; logic configured to generate a partial key based on the full key; logic configured to generate a set membership filter entry based on the full key; logic configured to identify a matching hash bucket based on the hash bucket identifier; logic configured to determine whether an existing head hash block, included within an existing head hash bucket unit in the matching hash bucket, is full; logic configured to create a new head hash bucket unit having a new head hash block if the existing head hash bock is full; logic configured to add the set membership filter entry to a set membership filter of the new head hash bucket unit if the new head hash bucket unit has been created, else the existing head hash bucket unit; and logic configured to store a new hash entry in the new head hash block if the new head hash block has been created, else the existing head hash block, the new hash entry including at least the partial key and an address value at which the new key-value entry is stored in the content store.

According to a ninth aspect, the store interaction component is configured to update a key-value entry by: storing a new version of the key-value entry in the content store; and storing a new hash entry corresponding to the new version of the key-value entry in the index, while preserving an old hash entry corresponding to a previous version of the key-value entry. The index enables retrieval of either the new version or the old version.

According to a tenth aspect, the store interaction component includes a query component which is configured to locate a sought-after key-value entry in the key-value storage system. The query component includes: logic configured to receive a full key associated with the sought-after key-value entry; logic configured to hash the full key to generate a hash bucket identifier; logic configured to generate a partial key based on the full key; logic configured to generate a set membership filter entry based on the full key; logic configured to identify a matching hash bucket based on the hash bucket identifier; logic configured to identify a matching hash bucket unit by comparing the set membership filter entry to each set membership filter of the matching hash bucket until a match is found, if any, wherein the matching hash bucket unit includes an associated matching hash block; logic configured to determine whether the matching hash block is provided in the in-memory index store; and logic configured to retrieve the matching hash block from the secondary index store and store the matching hash block in the in-memory index store if it is not already in the in-memory index store.

According to an eleventh aspect, the query component further includes: logic configured to identify a matching hash entry, if any, in the matching hash block, by comparing the partial key of the sought-after key-value entry with each hash entry in the matching hash block; and logic configured to retrieve a key-value entry from the content store that matches an address value specified by the matching hash entry, to provide a retrieved key-value entry.

According to a twelfth aspect, the query component further includes: logic configured to determine whether a full key associated with the retrieved key-value entry matches a full key associated with the sought-after key-value entry; and logic configured to continue a search within the index if the full key of the retrieved key-value entry does not match the full key associated with the sought-after key-value entry.

According to a thirteenth aspect, the store interaction component includes a relocation and eviction (R&E) component configured to update the index in response to operation of garbage collection functionality. The R&E component includes: logic configured to receive modification information for a modified key-value entry, the modified key-value entry corresponding to a particular key-value entry in the content store that has been modified by the garbage collection functionality, wherein the modification information includes an old address value associated with the particular key-value entry, a new address value associated with the particular key-value entry, and a key associated with the particular key-value entry; logic configured to find a matching hash entry in the index based on the modification information; and logic configured to update the matching hash entry based on the modification information.

According to a fourteenth aspect, in a first case, the particular key-value entry has been modified by the garbage collection functionality to move the particular key-value entry from an old location in the content store, associated with the old address value, to a new location in the content store, associated with the new address value. In that situation, the above-referenced logic configured to update is configured to update the matching hash entry by changing an address value specified by the matching hash entry to correspond to the new address value.

According to a fifteenth aspect, in a second case, the particular key-value entry has been modified by the garbage collection functionality to evict the particular key-value entry from the content store. In that situation, the new address value is set to an invalid value to indicate that the new address value is invalid, and the above-referenced logic configured to update is configured to update the matching hash entry by changing an address value specified by the matching hash entry to correspond to the invalid value.

According to a sixteenth aspect, in the second case, the above-referenced logic configured to update is further configured to update a partial key of the matching hash entry to correspond to an invalid value.

According to a seventeenth aspect, each group of set membership filters of a hash bucket has a configurable overall false positive probability, corresponding to a probability that a given set membership key matches any one of the group of set membership filters, yet a corresponding hash bucket unit does not contain a sought-after hash entry. Further, each particular hash block has a configurable block collision probability, corresponding to a probability that a given partial key matches a particular hash entry in the particular hash block, yet that particular hash entry does not identify a sought-after hash entry in the content store. Further, the key-value storage system exhibits a level of performance that depends at least on the configurable overall false positive probability and the configurable block collision probability.

According to an eighteenth aspect, a method is described for storing a new key-value entry in a key-value storage system. The method includes: storing the new key-value entry in a content store, the new key-value entry providing a full key and an associated value; identifying a matching hash bucket associated with the full key, the matching hash bucket including a linked list of hash bucket units, each hash bucket unit including a set membership filter and a hash block for storing hash entries; and storing a new hash entry at a head hash block associated with a head hash bucket unit of the linked list. Each linked list of hash bucket units stores at least one of its recently-created hash blocks in an in-memory index store and at least some of its other hash blocks in a secondary index store.

According to a nineteenth aspect, each hash entry in the above-described method specifies a partial key associated with a full key of a corresponding key-value entry provided in the content store.

According to a twentieth aspect, a computer-readable storage medium is described for storing computer-readable instructions, the computer-readable instructions, when executed by one or more processor devices, performing a method for retrieving information from a content store. The method includes: receiving a full key associated with a sought-after key-value entry in the content store; generating a partial key and a set membership filter entry based on the full key; identifying a matching hash bucket associated with the full key, the matching hash bucket including a linked list of hash bucket units, each hash bucket unit including a set membership filter and a hash block for storing hash entries; identifying a matching hash bucket unit in the matching hash bucket based on the set membership filter entry, the matching hash bucket unit including a matching hash block; retrieving the matching hash block from a secondary index store and storing the matching hash block in an in-memory index store if the matching hash block is not already in the in-memory index store; identifying a matching hash entry, if any, in the matching hash block based on the partial key; retrieving a key-value entry from the content store based on an address value specified by the matching hash entry, to provide a retrieved key-value entry; and determining whether a full key associated with the retrieved key-value entry matches a full key associated with the sought-after key-value entry.

A twenty-first aspect corresponds to any combination (e.g., any permutation or subset) of the above-referenced first through twenty-first aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A key-value storage system implemented by one or more computing devices, the key-value storage system comprising:
   a content store storing key-value entries that include full keys and respective associated values;
   an index including:
      hash buckets including collections of linked hash bucket units,
      the hash bucket units including set membership filters and hash blocks,
      the set membership filters providing a mechanism for determining whether a set membership key under consideration is associated with a corresponding hash bucket unit, the set membership key being derived from a particular full key under consideration,
      the hash blocks including hash entries,
      the hash entries providing at least partial keys and address values,
      the partial keys being derived from the respective full keys,
      the address values specifying locations of corresponding key-value entries in the content store, and
      one or more of recently-created hash blocks being stored in an in-memory index store, and at least some other hash blocks being stored in a secondary index store;
   one or more processor devices; and
   a computer-readable storage medium storing computer-readable instructions which, when executed by the one or more processor devices, cause the one or more processor devices to:
      store the hash entries in a particular collection of linked hash bucket units in a chronological order based at least on a time of creation, by storing a new hash entry in a head hash bucket unit of the particular collection, and creating a new head hash bucket unit when a previous head hash bucket unit cannot accommodate the new hash entry,
      receive modification information for a modified key-value entry in the content store that has been modified by garbage collection functionality, the modification information including an old address value associated with the modified key-value entry, a modified address value associated with the modified key-value entry, and a modified key associated with the modified key-value entry;
      find a matching hash entry in the index based at least on the modification information; and
      update the matching hash entry based at least on the modification information.

2. The key-value storage system of claim 1, wherein the key-value storage system is implemented, at least in part, by one or more server computing devices associated with a network-accessible storage service.

3. The key-value storage system of claim 1, wherein the key-value storage system is implemented, at least in part, by a client computing device.

4. The key-value storage system of claim 1, wherein the key-value storage system omits sorting functionality for sorting the partial keys in the index.

5. The key-value storage system of claim 1, wherein a pair of a partial key and a set membership key are based at least on different portions of a corresponding full key.

6. The key-value storage system of claim 1, wherein each set membership filter corresponds to a bloom filter.

7. The key-value storage system of claim 1, wherein the hash bucket units include pointers that point to locations at which hash blocks are stored in the secondary index store.

8. The key-value storage system of claim 1, wherein the computer-readable instructions further cause the one or more processor devices to:
   receive a new full key and a new value associated with a new key-value entry;
   store the new full key and new value associated with the new key-value entry in the content store;
   hash the new full key to generate a new hash bucket identifier;
   generate a new partial key based at least on the new full key;
   generate a new set membership filter entry based at least on the new full key;
   identify a matching hash bucket based at least on the new hash bucket identifier;
   determine whether an existing head hash block, included within an existing head hash bucket unit in the matching hash bucket, is full;
   in response to determining that the existing head hash block is full:
      create a new head hash bucket unit having a new head hash block;
      add the new set membership filter entry to a set membership filter of the new head hash bucket unit; and
      store a new hash entry in the new head hash block, the new hash entry including at least the new partial key and a new address value at which the new key-value entry is stored in the content store; and
   in response to determining that the existing head hash block is not full:
      add the new set membership filter entry to a set membership filter of the existing head hash bucket unit; and
      store the new hash entry in the existing head hash block.

9. The key-value storage system of claim 1, wherein the computer-readable instructions further cause the one or more processor devices to:
   store a new version of a particular key-value entry in the content store; and
   store a new hash entry corresponding to the new version of the particular key-value entry in the index, while preserving an old hash entry corresponding to a previous version of the particular key-value entry,
   the index enabling retrieval of either the new version or the previous version.

10. The key-value storage system of claim 1, wherein the computer-readable instructions further cause the one or more processor devices to:
- receive a sought-after full key associated with a sought-after key-value entry;
- hash the sought-after full key to generate a sought-after hash bucket identifier;
- generate a sought-after partial key based at least on the sought-after full key;
- generate a sought-after set membership filter entry based at least on the sought-after full key;
- identify a matching hash bucket based at least on the sought-after hash bucket identifier;
- identify a matching hash bucket unit by comparing the sought-after set membership filter entry to each set membership filter of the matching hash bucket until a match is found, wherein the matching hash bucket unit includes an associated matching hash block;
- determine whether the matching hash block is provided in the in-memory index store; and
- retrieve the matching hash block from the secondary index store and store the matching hash block in the in-memory index store in response to determining that the matching hash block is not provided in the in-memory index store.

11. The key-value storage system of claim 10, wherein the computer-readable instructions further cause the one or more processor devices to:
- identify a matching hash entry in the matching hash block, by comparing the sought-after partial key of the sought-after key-value entry with each hash entry in the matching hash block; and
- retrieve a key-value entry from the content store that matches an address value specified by the matching hash entry, to provide a retrieved key-value entry.

12. The key-value storage system of claim 11, wherein the computer-readable instructions further cause the one or more processor devices to:
- determine whether a retrieved full key associated with the retrieved key-value entry matches the sought-after full key associated with the sought-after key-value entry; and
- continue a search within the index in response to determining that the retrieved full key of the retrieved key-value entry does not match the sought-after full key associated with the sought-after key-value entry.

13. The key-value storage system of claim 1,
wherein the modified key-value entry has been modified by the garbage collection functionality to move the modified key-value entry from an old location in the content store, associated with the old address value, to a new location in the content store, associated with the modified address value, and
wherein the computer-readable instructions further cause the one or more processor devices to update the matching hash entry by changing a matching address value specified by the matching hash entry to correspond to the modified address value.

14. The key-value storage system of claim 1,
wherein the modified key-value entry has been modified by the garbage collection functionality to evict the modified key-value entry from the content store,
wherein the modified address value is set to an invalid value to indicate that the modified address value is invalid, and
wherein the computer-readable instructions further cause the one or more processor devices to update the matching hash entry by changing a matching address value specified by the matching hash entry to correspond to the invalid value.

15. The key-value storage system of claim 14, wherein the computer-readable instructions further cause the one or more processor devices to update a matching partial key of the matching hash entry to correspond to an invalid value.

16. The key-value storage system of claim 1, wherein:
- each group of set membership filters has a configurable overall false positive probability, corresponding to a probability that a given set membership key matches any one of the group of set membership filters, yet a corresponding hash bucket unit does not contain a sought-after hash entry,
- each particular hash block has a configurable block collision probability, corresponding to a probability that a given partial key matches a particular hash entry in the particular hash block, yet that particular hash entry does not identify a sought-after hash entry in the content store, and
- the key-value storage system exhibiting a level of performance that depends at least on the configurable overall false positive probability and/or the configurable block collision probability.

17. A method, comprising:
- storing a new key-value entry in a content store, the new key-value entry providing a full key and an associated value;
- identifying, in an index, a matching hash bucket associated with the full key, the matching hash bucket including a linked list of hash bucket units, the hash bucket units including set membership filters and hash blocks storing hash entries;
- storing a new hash entry associated with the new key-value entry at a head hash block associated with a head hash bucket unit of the linked list, the linked list of hash bucket units storing one or more recently-created hash blocks in an in-memory index store and storing pointers in the in-memory index store that point to locations of at least some other hash blocks stored in a secondary index store;
- receiving modification information for a modified key-value entry in the content store that has been modified by garbage collection functionality, the modification information including an old address value associated with the modified key-value entry, a modified address value associated with the modified key-value entry, and a modified key associated with the modified key-value entry;
- finding a matching hash entry in the index based at least on the modification information; and
- updating the matching hash entry based at least on the modification information.

18. The method of claim 17, wherein each hash entry specifies a partial key associated with a full key of a corresponding key-value entry provided in the content store.

19. A computer-readable storage medium storing computer-readable instructions which, when executed by one or more processor devices, cause the one or more processor devices to:
- receive a sought-after full key associated with a sought-after key-value entry in a content store;
- generate a sought-after partial key and a sought-after set membership filter entry based at least on the sought-after full key;
- access an index stored in an in-memory index store, the index including hash buckets, the hash buckets including linked lists of hash bucket units, the hash bucket units including set membership filters and hash blocks, the hash blocks including hash entries;

identify, in the index, a matching hash bucket associated with the sought-after full key;

identify a matching hash bucket unit in the matching hash bucket based at least on the sought-after set membership filter entry;

determine whether a matching hash block in the matching hash bucket unit is stored in the in-memory index store;

upon determining that the matching hash block is not stored in the in-memory index store, retrieve the matching hash block from a secondary index store at which the matching hash block is stored based at least on a pointer in the matching hash bucket unit that points to a location of the matching hash block in the secondary index store, and store the matching hash block in the in-memory index store;

identify a first matching hash entry in the matching hash block based at least on the sought-after partial key;

retrieve a key-value entry from the content store based at least on an address value specified by the first matching hash entry, to provide a retrieved key-value entry;

determine whether a retrieved full key associated with the retrieved key-value entry matches the sought-after full key associated with the sought-after key-value entry;

receive modification information for a modified key-value entry in the content store that has been modified by garbage collection functionality, the modification information including an old address value associated with the modified key-value entry, a modified address value associated with the modified key-value entry, and a modified key associated with the modified key-value entry;

find a second matching hash entry in the index based at least on the modification information; and update the second matching hash entry based at least on the modification information.

20. The computer-readable storage medium of claim 19, wherein the hash bucket units store one or more recently-accessed hash blocks in the in-memory index store.

* * * * *